Figure 1:
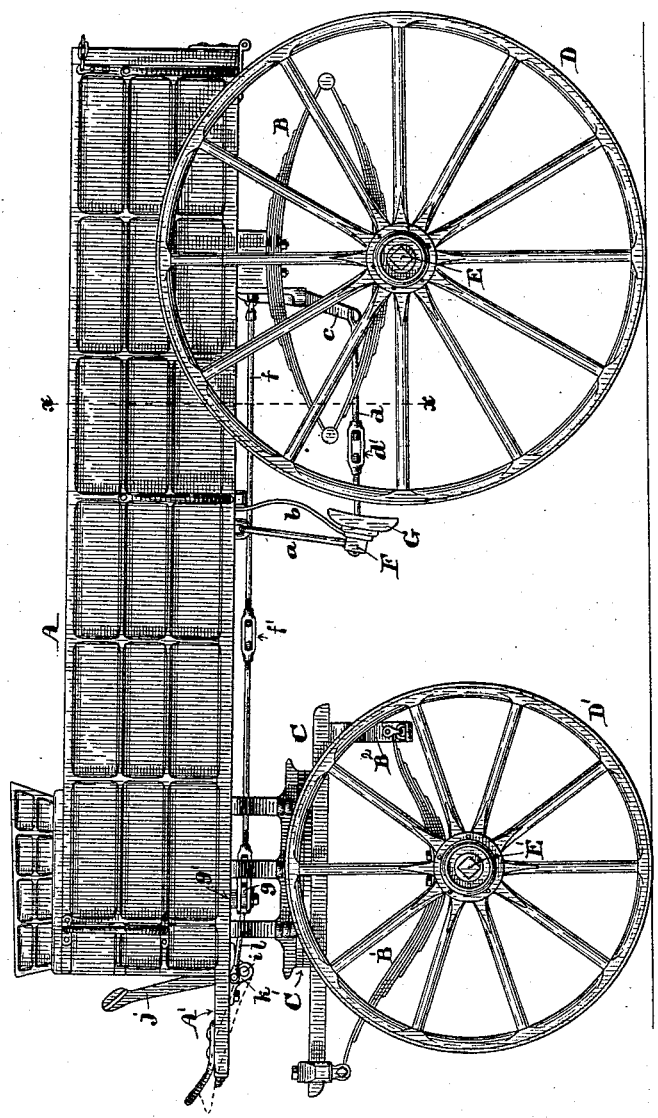

(No Model.) 2 Sheets—Sheet 1.

H. C. STROUT.
VEHICLE BRAKE.

No. 455,804. Patented July 14, 1891.

Witnesses:
Walter E. Lombard
J. Clifford Entwisle

Inventor:
Harvey C. Strout,
by N. C. Lombard
Attorney.

(No Model.) 2 Sheets—Sheet 2.
H. C. STROUT.
VEHICLE BRAKE.
No. 455,804. Patented July 14, 1891.
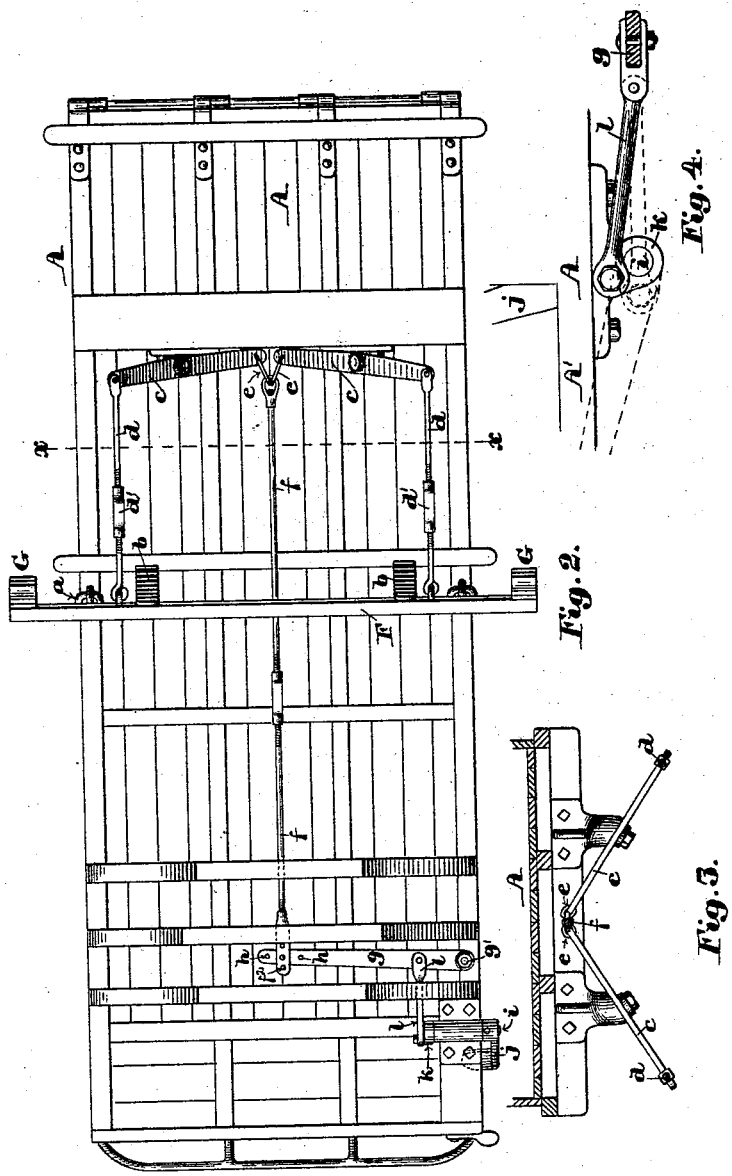
Witnesses:
Walter E. Lombard
J. Clifford Entwisle
Inventor:
Harvey C. Strout,
by N. C. Lombard
Attorney.

UNITED STATES PATENT OFFICE.

HARVEY C. STROUT, OF PEABODY, MASSACHUSETTS.

VEHICLE-BRAKE.

SPECIFICATION forming part of Letters Patent No. 455,804, dated July 14, 1891.

Application filed April 23, 1891. Serial No. 390,094. (No model.)

*To all whom it may concern:*

Be it known that I, HARVEY C. STROUT, of Peabody, in the county of Essex and State of Massachusetts, have invented certain new and useful Improvements in Vehicle-Brakes, of which the following, taken in connection with the accompanying drawings, is a specification.

My invention relates to vehicle-brakes, is adapted for use on all carriages requiring brakes and on street-cars, and has for its object the production of a brake that when once set will remain set until released by the operator; and it consists in certain novel features of construction, arrangement, and combination of parts, which will be readily understood by reference to the description of the drawings and to the claims hereinafter given, and in which my invention is clearly pointed out.

Figure 1 of the drawings is a side elevation of an express-wagon with my invention applied thereto. Fig. 2 is an inverted plan of so much thereof as is necessary to illustrate my invention. Fig. 3 is a transverse sectional elevation of a portion of the same, the cutting plane being on line $x\ x$ on Figs. 1 and 2. Fig. 4 is an elevation of the crank and connecting link for operating the brake drawn to an enlarged scale.

In the drawings, A is the body of the vehicle mounted upon the springs B, B', and $B^2$, between the latter two of which and said body is interposed the platform C and fifth-wheel C' in a well-known manner.

D and D' are respectively the rear and forward wheels mounted upon the axles E and E' in a well-known manner.

F is a brake-bar extending across the vehicle in front of the rear wheels, and has secured to each end thereof, in front of said wheels, a brake-shoe G, as shown.

The brake-bar F is suspended from the body of the vehicle by the pivoted arms $a\ a$, is pressed away from contact with the wheel-tires by the springs $b$, and is connected with the outer ends of the two levers $c\ c$ by the rods $d\ d$, each provided with a turn-buckle $d'$, as shown. The inner ends of the two levers $c\ c$ are each connected by an independent short link $e$ to the rear end of the rod $f$, which may or may not be provided with the turn-buckle $f'$, as may be desired, the forward end of said rod $f$ being pivoted to the movable end of the lever $g$, which is pivoted at $g'$ to the body of the vehicle, and is provided with a series of holes $h$ in its free or movable end, by means of which the pivotal connection of the rod $f$ may be adjusted to a greater or less distance from the pivot $g'$, the forward end of said rod $f$ also having a series of holes $f^2$ formed therein as a means of adjusting the length of said rod in addition to the turn-buckle $f'$, or to be used in case said turn-buckle is not used.

A rocker-shaft $i$ is mounted in bearings beneath the body of the vehicle at or near the rear of the foot-board A', and has secured to its outer end the pedal-lever $j$ and at its other end the crank $k$, to the crank-pin of which is connected one end of the link $l$, the other end of which is pivoted to the lever $g$, as shown in Fig. 2.

When the brake-shoes are removed from contact with the wheels, the crank $k$, link $l$, and pedal-lever $j$ are in the relative positions shown in full lines in Fig. 4; but when the brake is set they assume the positions shown in dotted lines in said figure.

By this construction and arrangement of the parts I produce a brake that may be pressed with great force into contact with the tires of the wheels, and when so set will remain set until the pedal-lever is raised by the operator, which is considered a very important feature, as it serves as a check on the horse or horses when left unhitched while the driver is away making calls or attending to business.

When desired, the connections may be so adjusted that the brake may be used without being set, or, in other words, so that the crank will not be depressed to a position in line with the center line of the link $l$; but I prefer to arrange the parts, as shown in the drawings, so that when the pedal-lever is depressed to its lowest position the center radial line of the crank and the link shall be in the same plane, as above described.

What I claim as new, and desire to secure by Letters Patent of the United States, is—

1. In a vehicle-brake, the combination, with the brake-bar and the brake-shoes, of a rocker-shaft, a pedal-lever for rocking the same, a crank secured on said shaft, a link connected at one end to the crank-pin, and a system of levers and rods connecting the other end of said link and the brake-bar, all so constructed and arranged that when the brake is set the centers of the crank-pin and its shaft and the center line of said link shall all be in the same horizontal plane.

2. In a vehicle-brake, the combination, with the brake-bar and the brake-shoes, of a rocker-shaft, a crank secured thereon, a pedal-lever for rocking the same, a link connected by one end to the pin of said crank, a system of levers and rods connecting the other end of said link to the brake-bar, and turn-buckles for adjusting the lengths of said rods to compensate for the wear of the parts, all so constructed and arranged that when the pedal-lever is depressed to force the brake-shoes against the tires of the wheels the center line of the link and the centers of the rocker-shaft and the crank-pin shall all be in the same horizontal plane.

3. The combination of the brake-bar F, the brake-shoes G, the suspension-arms $a$ $a$, the springs $b$ $b$, the levers $c$ $c$ and $g$, the rods $d$ $d$ and $f$, the link $l$, the crank $k$, the rocker-shaft $i$, and the pedal-lever $j$, all constructed, arranged, and adapted to operate substantially as described.

In testimony whereof I have signed my name to this specification, in the presence of two subscribing witnesses, on this 21st day of April, A. D. 1891.

HARVEY C. STROUT.

Witnesses:
N. C. LOMBARD,
WALTER E. LOMBARD.